United States Patent
Wang

(10) Patent No.: US 10,380,890 B2
(45) Date of Patent: Aug. 13, 2019

(54) AUTONOMOUS VEHICLE LOCALIZATION BASED ON WALSH KERNEL PROJECTION TECHNIQUE

(71) Applicant: Baidu USA LLC, Sunnyvale, CA (US)

(72) Inventor: Quan Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 267 days.

(21) Appl. No.: 15/427,973

(22) Filed: Feb. 8, 2017

(65) Prior Publication Data

US 2018/0225968 A1   Aug. 9, 2018

(51) Int. Cl.

| | | |
|---|---|---|
| G01C 21/00 | (2006.01) | |
| G08G 1/13 | (2006.01) | |
| G01C 21/30 | (2006.01) | |
| G01S 17/06 | (2006.01) | |
| G01S 17/89 | (2006.01) | |
| G01S 19/45 | (2010.01) | |
| G01S 5/16 | (2006.01) | |
| G01S 7/48 | (2006.01) | |

(52) U.S. Cl.
CPC ............ *G08G 1/13* (2013.01); *G01C 21/30* (2013.01); *G01S 5/16* (2013.01); *G01S 7/4808* (2013.01); *G01S 17/06* (2013.01); *G01S 17/89* (2013.01); *G01S 19/45* (2013.01)

(58) Field of Classification Search
USPC ..................... 701/400–541, 23–28
See application file for complete search history.

(56) References Cited

U.S. PATENT DOCUMENTS

| | | | | |
|---|---|---|---|---|
| 6,694,233 | B1* | 2/2004 | Duff .................... | G05D 1/0246 340/988 |
| 8,538,673 | B2* | 9/2013 | Sislak ................. | G06Q 10/047 701/301 |
| 9,037,403 | B2* | 5/2015 | Delp .................... | G05D 1/0212 701/445 |
| 9,274,525 | B1* | 3/2016 | Ferguson ............ | G05D 1/0274 |
| 9,863,775 | B2* | 1/2018 | Kojo ................. | G05D 1/0268 |
| 10,240,934 | B2* | 3/2019 | Miksa .................... | G01C 21/30 |
| 2013/0138247 | A1* | 5/2013 | Gutmann ............. | G05D 1/0231 700/253 |
| 2014/0088855 | A1* | 3/2014 | Ferguson ............... | G08G 1/166 701/117 |

(Continued)

*Primary Examiner* — Jonathan L Sample
(74) *Attorney, Agent, or Firm* — Womble Bond Dickinson (US) LLP

(57) ABSTRACT

Location of an autonomous driving vehicle (ADV) is determined with respect to a high definition map. On-boards sensors of the ADV obtain a 3D point cloud of objects surrounding the ADV. The 3D point cloud is organized into an ADV feature space of cells. Each cell has a median intensity value and a variance in elevation. A set of candidate cells that surround the ADV is determined. For each candidate, a set of cells of the ADV feature space that surround the candidate cell is projected onto the map feature space using kernel projection, for one or more dimensions. Kernels can be Walsh-Hadamard vectors. Candidates having insufficient similarity are rejected. When a threshold number of non-rejected candidates remain, candidate similarity can be determined using a similarity metric. The coordinates of the most similar candidate cell are used to determine the position of the vehicle with respect to the map.

21 Claims, 10 Drawing Sheets

(56) References Cited

U.S. PATENT DOCUMENTS

| | | | |
|---|---|---|---|
| 2014/0297092 A1* | 10/2014 | Delp | G05D 1/0212 |
| | | | 701/25 |
| 2015/0022675 A1* | 1/2015 | Lord | G06K 9/6253 |
| | | | 348/207.1 |
| 2016/0138924 A1* | 5/2016 | An | G01C 21/34 |
| | | | 701/25 |
| 2016/0257307 A1* | 9/2016 | Delp | G01C 21/3658 |
| 2017/0052032 A1* | 2/2017 | Miksa | G01C 21/28 |
| 2017/0057634 A1* | 3/2017 | Hunt | B64C 39/024 |
| 2017/0109644 A1* | 4/2017 | Nariyambut Murali | |
| | | | G06N 20/00 |
| 2017/0262709 A1* | 9/2017 | Wellington | G06K 9/00791 |
| 2017/0307751 A1* | 10/2017 | Rohani | G01S 13/865 |
| 2017/0343356 A1* | 11/2017 | Roumeliotis | G01C 21/32 |
| 2018/0058861 A1* | 3/2018 | Doria | G01C 21/32 |
| 2018/0067966 A1* | 3/2018 | Oder | G06K 9/00791 |
| 2018/0143647 A1* | 5/2018 | Wang | G06N 20/00 |
| 2018/0190046 A1* | 7/2018 | Levinson | G01S 15/931 |
| 2018/0216942 A1* | 8/2018 | Wang | G01C 21/32 |

\* cited by examiner

AUTONOMOUS VEHICLE LOCALIZATION BASED ON WALSH KERNEL PROJECTION TECHNIQUE

TECHNICAL FIELD

Embodiments of the present invention relate generally to operating autonomous vehicles. More particularly, embodiments of the invention relate to improving efficiency and accuracy of autonomous vehicle localization.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One fundamental challenge of autonomous driving is efficiently, accurately, and in real-time, determining the location of an autonomous driving vehicle (ADV) with respect to a high definition (HD) map having various crucial information annotated. In a worst case, accuracy needs to be within 10 cm. ADV position in the high definition (HD) map is used by ADV system components such as perception, planning, and control, to make precise and timely ADV driving decisions. To determine a position of the ADV within the HD map, one or more ADV position sensors are included in, or on, the ADV. Sensors can include a global positioning satellite detector (GPS), inertial measurement unit sensor (IMU), radio detection and ranging (RADAR) and light detection and ranging (LIDAR). Existing hardware-based positioning systems, such as global positioning satellite sensor (GPS) and inertial measurement unit sensor (IMU) cannot provide the necessary accuracy with respect to the HD map, especially for dynamic urban environment having complex signal occlusion situations.

Existing localization methods for autonomous driving vehicles typically are or three major categories: 2D, 3D and 2D-3D fused methods. Among these three, 3D based methods using laser scanner (e.g. LIDAR sensor) is currently popular due to its high accuracy and reliability. Prior art methods using a LIDAR sensor to determine ADV position in an HD map are computationally expensive and have only modest accuracy and modest robustness.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
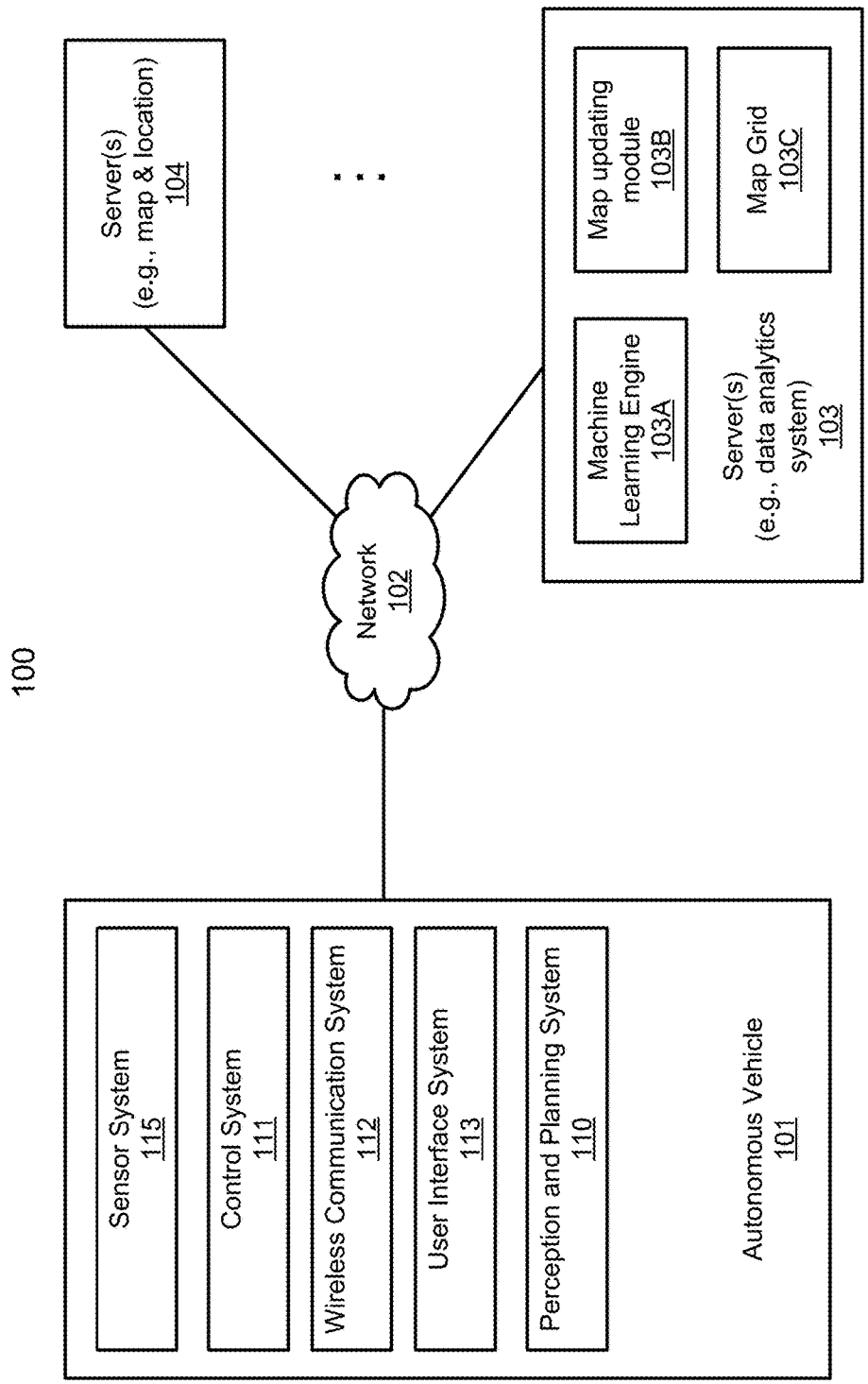
FIG. 1 is a block diagram illustrating an overview of a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In a first embodiment, a method of determining a location of an ADV with respect to a high definition (HD) map includes determining an approximate location of the ADV using, e.g., global position satellite location data. A database containing an HD map corresponding to the GPS location can be accessed to obtain an annotated feature space of the HD map. A typical GPS reading is accurate within about 3 meters resolution. The HD map can include cells, e.g. 10 cm×10 cm, with an elevation associated with each cell and an intensity value, such as an intensity value obtained from a plurality of LIDAR readings. An intensity value indicates a nature of the surface of an object that reflects the LIDAR. An intensity may be high for an object having a hard surface directly reflecting the LIDAR laser. An intensity may be low for an object having soft or irregular surface, such as a bush or a person. The HD map can include annotations for each cell including a mean of sensor intensity readings used to generate the cell, and an variance of elevation information obtained from the plurality of sensor readings used to generate the cell. Each cell may further include location information that can be used to determine the location of an ADV with respect to the HD map.

An ADV can use sensors, e.g. LIDAR, to collect a 3D point cloud of sensor data surrounding the ADV. The sensor data can be analyzed and broken down into cells, such as 10 cm×10 cm, or less. Like the HD map, the collection of cells can be used to generate a feature space surrounding the ADV. A feature space can comprise (x,y) coordinates of a cell, with respect to the ADV, a mean intensity of the sensor readings, and a variance of the elevation readings in the sensor data. From the ADV feature space, a candidate search space of, e.g. 32×32 candidate cells can be selected that surround the ADV, representing a physical space of about 3 meters×3 meters. A step size can be chosen to step through the candidate cells. For example, a step size of two would mean that every other cell in the candidate cells is used to determine a similarity of a feature space surrounding the candidate cell for its similarity to an HD map feature space. The candidate feature space surrounding the candidate cell can be about 1024×1024 cells (a square of about 100 meters per side). The HD map can also have an HD map feature space of about 1024×1024 cells. A similarity metric can be determined for each traversed candidate cell. The similarity metric quantifies the degree of similarity of a feature space surrounding the candidate cell to a feature space of the HD map. The similarity metric can be based, at least in part, on a mean of the intensity attribute of the candidate cell, and the variance of the elevation attribute of the cell. In an embodiment, the first candidate cell similarity metric can be computed. A candidate cell having a highest similarity metric can be determined.

In another embodiment, an ADV can collect 3D point cloud information for use in generating an update to the HD map. An approximate location of the ADV can be determined using, e.g., global position satellite location data. A portion of the HD map corresponding to the approximate location of the ADV can be obtained. In an embodiment, the HD map portion is at least 1024×1024 cells in size (a square of approximately 100 meters on each edge). The ADV can use sensors, e.g. LIDAR, to collect the 3D point cloud of sensor data surrounding the ADV. The 3D point cloud can be analyzed and broken down into cells, such as 10 cm×10 cm, or less. The collection of cells can be used to generate a feature space surrounding the ADV. A feature space can comprise (x,y) coordinates of a cell, with respect to the ADV, a mean intensity of the sensor readings, and a variance of the elevation readings in the sensor data. From the ADV feature space, a candidate search space of, e.g. 32×32 candidate cells can be selected that surround the ADV, representing a physical space of about 3 meters×3 meters. A step size can be chosen to step through the candidate cells. For example, a step size of two would mean that every other cell in the candidate cells is used to check a candidate feature space surrounding the candidate for its similarity to an HD map feature space. The candidate feature space surrounding the candidate cell can be about 1024×1024 cells (a square of approximately 100 meters on each edge). The HD map can also have an HD map feature space of about 1024×1024 cells. A similarity metric can be determined for each of the candidate cells. The similarity metric can be based, at least in part, on a mean of the intensity attribute of the candidate cell, and the variance of the elevation attribute of the cell. A candidate cell having a highest similarity metric can be determined.

After the ADV feature space is aligned to the HD map, the ADV feature space can be uploaded to a server for further analysis to update the HD map. In an embodiment, the server analyzes differences between the uploaded ADV feature space, and the HD map feature space. Differences may include new buildings, trees, people, different temporary objects, and the like. In an embodiment, the elevation information of a cell is a reliable indicator of the cell contents. For example, one or more a tall buildings are likely to be a relatively constant in the HD map, and may be more constant than e.g. people who have motion (thus varying intensity) and a low height as compared to buildings.

In another embodiment, an improved data structured for storing large, fast-changing data sets, such as the ADV features space surrounding the ADV, can include a pre-allocated, or static, array of feature space cells indexed by an updateable index. In an embodiment, an array of feature space cells can determine a number of cells of distance change (offset) since a last feature space calculation. An x-coordinate index array and a y-coordinate index array can be used to rotate or realign the indices of the grid of feature space cells so that new data can be added, overwriting old data that is no longer a part of the grid of the feature space. This allows data that is unchanged from a first time, t0, to a second time t1, to remain in the same grid space memory at a second time t1. This saves a substantial amount of memory "move" operations and also saves the overhead of allocating and deallocating memory space as the ADV physically moves and the ADV feature space data is updated.

FIG. 1 is a block diagram illustrating an overview of a networked system according to one embodiment of the invention. Referring to FIG. 1, network configuration 100 includes autonomous vehicle 101 that may be communicatively coupled to one or more servers 103-104 over a network 102. Although there is one autonomous vehicle 101 shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. An example server system is described below with reference to FIG. 9. Server(s) 103 can include an analytics system that include a machine learning engine 103A and a map updating module 103B, and a map grid module 103C.

An autonomous vehicle 101 refers to a vehicle that can be configured in an autonomous mode in which the vehicle navigates through an environment with little or no control input from a driver. Such an autonomous vehicle 101 can include a sensor system 115 having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Server 103 can include a data analytics system that includes a machine learning engine 103A, a map updating module 103B, and a map grid module 103C. Each such module can be implemented in software, hardware, or a combination thereof. In an embodiment, modules 103A, 103B, and 103C comprise at least one hardware processor.

Map updating module 103B can receive, from a plurality of ADVs, an ADV feature space data and an approximate geo-location associated with the ADV feature space. Machine learning engine 103A can process a large plurality of ADV feature spaces for a particular geo-location and use machine learning to generate a high definition (HD) map of the feature space at the geo-location. In an embodiment, ADVs that collect ADV feature space information can incorporate high-resolution GPS for accurately determining the geo-location associated with the ADV feature space. Map updating module 103B can determine a set of projection kernels, such as Gray Code Kernels use with the HD map feature space. In an embodiment, the Gray Code Kernels are a Walsh-Hadamard sequence of projection kernels. A single ADV feature space, or generated HD map feature space, can be used as a test image for preprocessing the HD map feature space using the kernels. The projection kernels can comprise an ordered set, applied in sequence, to generate Gray Code maps for each projection kernel dimension and store the generated Gray Code maps in association with the projection kernel dimension and feature space. In an embodiment, up to 500 dimensions of projection kernels can be generated and stored for use with the HD map feature space. In an embodiment, preprocessing the HD map feature space with the kernel projection vectors can include determining a relationship between the amount of similarity capture be each successive kernel projection kernel, and determining a number of dimensions of projection kernel for an ADV to use in determining a similarity score between an ADV feature space centered on a candidate cell and the HD map feature space. In an embodiment, the determined number of dimensions of projection kernel can be five (5). The HD feature space map and associated kernel projections for each dimension of the Gray Code Kernels can be stored as the map grid 103C.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
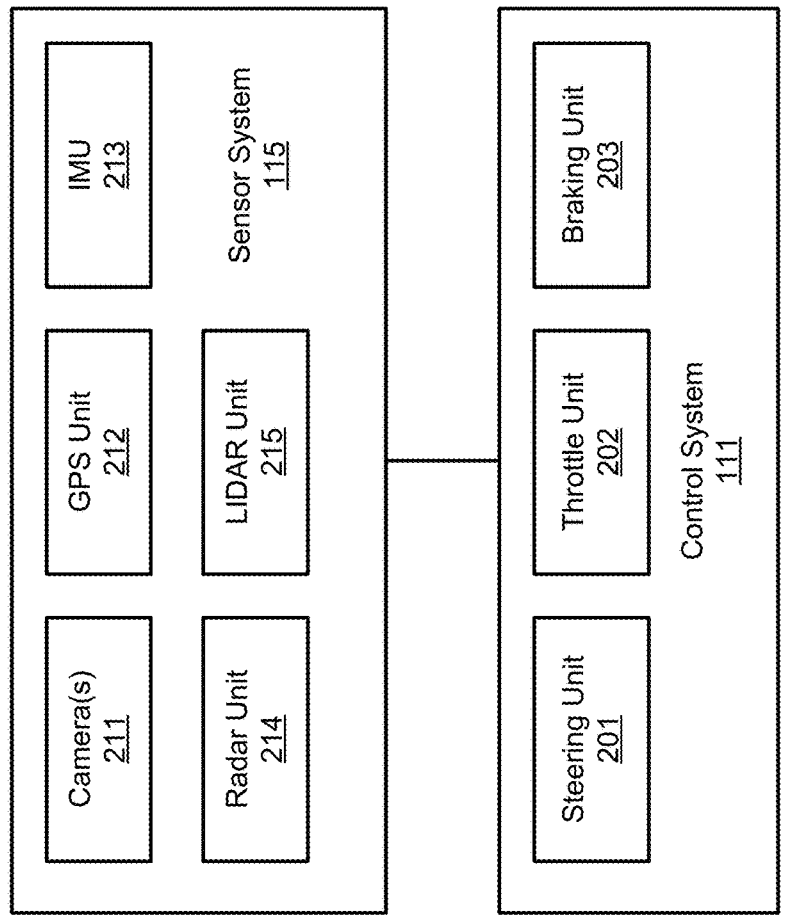
FIG. 2 is a block diagram illustrating an example of an autonomous driving vehicle (ADV) sensor and control module, according to one embodiment of the invention.

FIG. 2 is a block diagram illustrating an example of an autonomous driving vehicle (ADV) sensor and control module, according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., microphone). An audio sensor may be configured to capture sound from the environment surrounding the autonomous vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111. In an embodiment, a planning portion of the perception and planning module 110 can be turned off. In an embodiment, control system 111 can be turned off. The autonomous vehicle 101 can then be driven by a human driver while the planning and control modules are turned off. The embodiments described herein utilize the planning module 110 and control systems 111, which are turned on.

In operation, a user as a passenger may specify a starting location and a destination of a trip, for example, via a user interface 113. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In an autonomous vehicle 101, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there can be a corresponding display channel to stream the corresponding content to be displayed at real-time, which may be centrally processed by an augmenting reality system, e.g., a data processing system 110. In such situation, an augmented image is displayed in a virtual reality manner via infotainment system 114, also referred to as an augmented reality manner.

In embodiments described herein, outputs from each sensor in the sensor system 115 can be logged while the autonomous vehicle 101 driven in automated mode, with the planning and control modules turned on. Inputs to components of the control system 111 can be provided by the planning module 110.

Figure 3:
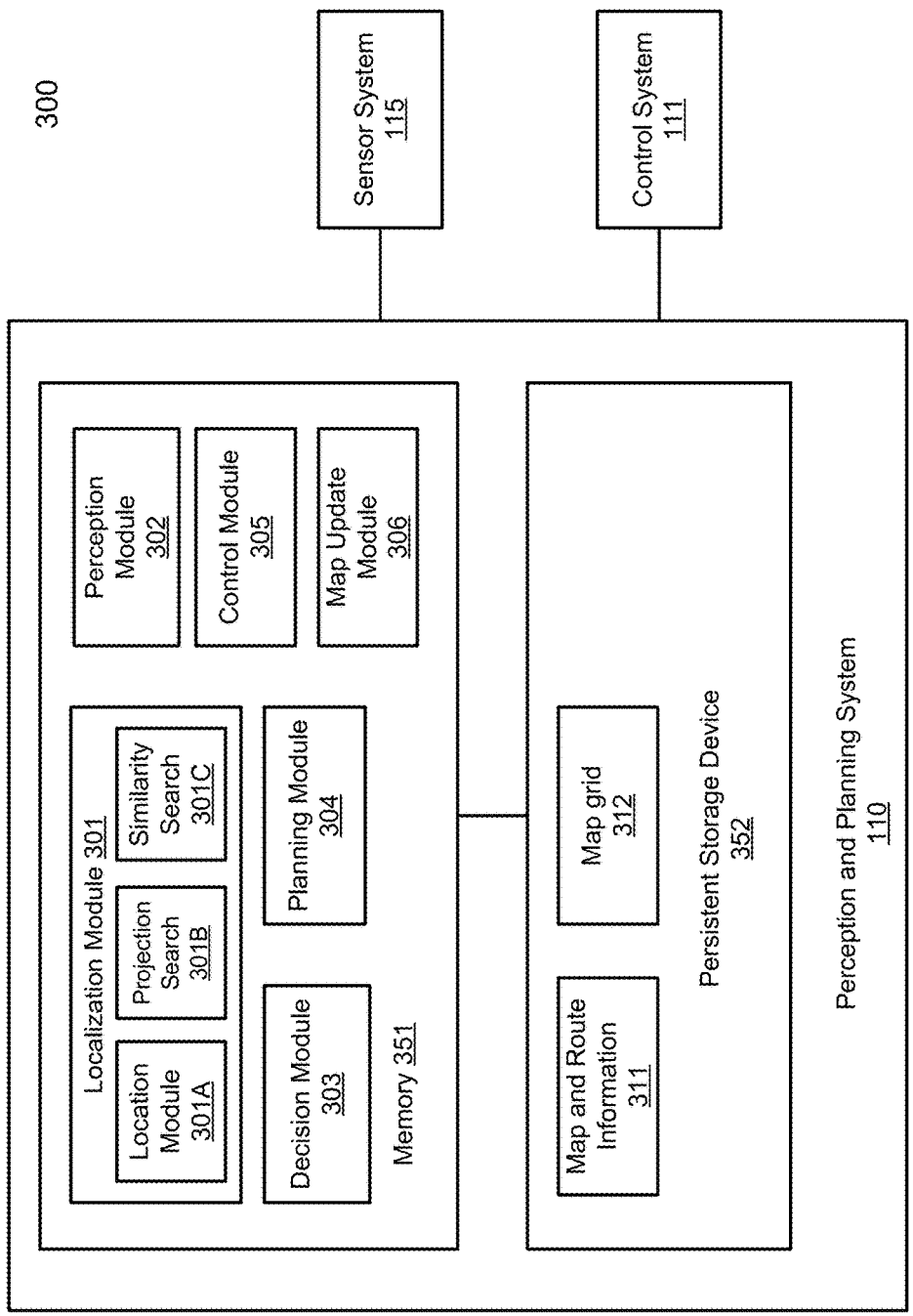
FIG. 3 is a block diagram illustrating an example of an ADV perception and planning system, according to one embodiment of the invention.

FIG. 3 is a block diagram illustrating an example of a system 300 comprising an ADV perception and planning system 110, sensor system 115, and control system 111 according to one embodiment of the invention. System 300 may be implemented as a part of autonomous vehicle 101 of FIG. 1. Referring to FIG. 3, perception and planning system 110 includes, but is not limited to, localization module 301, perception module 302, decision module 303, planning module 304, control module 305, and a map update module 306.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

An object of the localization module 301 is to determine with high accuracy a location of the ADV. ADV location can be approximately determined using, e.g. GPS. The GPS coordinate can be used to obtain a high definition (HD) map with a center at the GPS location and having an HD map feature space of cells of approximately 100 meters×100 meters. The ADV onboard sensors of the perception module 302 can also generate an ADV feature space of cells of approximately 100 meters×100 meters surrounding the ADV. To determine the actual location of the ADV with respect to the HD map, localization module 301 can find a best match of a candidate cell in a candidate portion of the ADV feature space to the HD map. The match determines an offset of the ADV from the GPS-centered HD map feature space. This offset can be used, in conjunction with the HD map feature space, to determine the actual high accuracy location of the ADV.

Localization module 301 can include a location module 301A, a projection search module 301B, and a similarity search module 301C. A location module 301A can obtain a 3D point cloud of sensor data from the sensors in perception module 302. The 3D point cloud represents sensor data surrounding the ADV. Location module 301A can analyze the 3D point cloud and generate an ADV feature space of cells of data, each representing an area of approximately 10 cm×10 cm. Each cell can have an (x,y) coordinate in the ADV feature space, a mean intensity and a variance of the elevation. In an embodiment, the ADV feature space can contain approximately 1024×1024 cells surrounding the ADV. The location module 301A can also obtain an approximate location of the ADV from, e.g. a GPS reading or coordinating with cell towers. The location module 301A can also obtain a high definition (HD) map of cells representing an HD map feature space of approximately 1024×1024 cells surrounding the GPS coordinate. Each cell of the HD map feature space can have an (x,y) coordinate representing an actual location of the cell in a real coordinate space, such as high resolution GPS or other coordinate system. Each cell of the HD map feature space can further include a mean intensity for the cell, and a variance of the elevation in the cell. The HD map feature space can further include annotations, including actual high-resolution location of each cell of the HD map, street address information, business information, restaurants, gas stations, and other useful information.

The approximate accuracy of GPS is about 3 meters resolution. Projection search module 301B can determine a candidate space of, e.g., 32×32 cells, surrounding the ADV, and match an ADV feature space of, e.g., 1024×1024 cells surrounding each candidate cell of the candidate space with an HD map feature space of, e.g., 1024×1024 cells.

A projection search module 301B can determine a candidate space of, e.g., 32×32 cells, surrounding the ADV. For each candidate cell of the candidate space, projection search module 301B can match an ADV feature space of, e.g., 1024×1024 cells surrounding the candidate cell with an HD map feature space of, e.g., 1024×1024 cells. A projection search module 301B can use a kernel projection method to determine a similarity score, or distance measure, between the ADV feature space surrounding each candidate cell and the HD map feature space. In an embodiment, projection search module 301B can determine a matching of an ADV feature space surrounding each candidate cell in a first sub-set of the candidate space. Projection search module 301B can determine a set of projection kernels to use for matching each ADV feature space surrounding a candidate cell of the first sub-set with the HD map feature space. In an embodiment, the set of projection kernels can comprise Gray Code Kernels. In an embodiment, the set of projection kernels can be ordered set such that the lowest ordered (first) dimension projection vector captures a largest portion of the similarity of the ADV feature space surrounding the candidate to the HD map feature space. Subsequent dimension projection kernels can capture increasingly finer amounts of feature space energy. Thus, using only a few kernel projections, a substantial amount of the matching information can be determined. Projection search module 301B can project the ADV feature space surrounding each candidate cell in the first sub-set onto a first projection kernel of the HD map feature space. In an embodiment, if the similarity score does not meet a threshold amount, the candidate cell is rejected as having a surrounding ADV feature space that is not similar enough to the HD map feature space to spend the overhead to perform a next kernel projection. Projection search module 301B can iteratively project the ADV feature space that surrounds each candidate cell onto the HD map feature space, using successive kernel projection dimensions, to obtain an updated similarity score. In an embodiment, if a candidate cell has an updated similarity score that does not indicate a sufficient degree of matching to the HD feature space, then the candidate cell can be marked as rejected. In an embodiment, projection search module 301B can iterate through each candidate in a first dimension, before iterating through each candidate for a second subsequent dimension of the projection kernels. In this embodiment, projection search module 301B can determine a highest similarity candidate at each iteration of a kernel projection dimension, and determine whether a single candidate has been the best matching candidate for more than one iteration of the non-rejected candidate cells. If so, this candidate cell may be deemed a best matching candidate as the center of the ADV feature space that should be aligned to the HD map feature space. In an embodiment, projection search module 301B can continue iterating through the candidate cells, using increasing dimensions of the projection kernels, until either a single candidate remains as the best candidate, or all candidates except one have been rejected, or all the non-rejected candidate cells have been iterated over all dimensions of the projection kernels, or a threshold number of non-rejected candidates remains. The remaining cells in the candidate space can form a second sub-set of the candidate space and can be searched using a similarity metric by similarity search module 301C.

Similarity search module 301C can search candidates in the second sub-set of candidate cells. The candidate cells in the second sub-set have not searched by projection search module 301B. For each candidate searched by similarity search module 301C, a candidate is selected for search, and a candidate space of ADV feature cells surrounding the candidate cell, e.g. 1024×1024 cells, can be matched to the HD map feature space of, e.g. 1024×1024 cells. In an embodiment, the candidate space of ADV feature cells surrounding the candidate cell can be 1024×1024 cells. Matching of an ADV space surrounding the candidate cell is performed using a similarity metric that performs a hybrid Gaussian fit of the candidate cell feature space (e.g. 1024×1024 cells) to the HD map feature space (e.g. 1024×1024 cells). The similarity metric formula is as follows:

$$P(z|x, y, m) = \Pi_{i,j} \exp\left(\frac{-(m_{r(i-x,j-y)} - z_{r(i,j)})^2}{2*(m_{\sigma(i-x,j-y)} + z_{\sigma(i,j)})^2}\right)^\alpha;$$

wherein P(z|x, y, m) represents a similarity score for the candidate feature space surrounding a candidate cell to the HD map feature space, i and j are iterators each ranging from 1 . . . 1024, (x, y) are the coordinates of a candidate cell, m represents map feature space cell data, z represents ADV feature space cell data, r represents the mean of a value, σ represents the variance of a value, and a is a tuning parameter. In an embodiment, the mean intensity of ADV and HD map feature space cell data are used in the numerator of the exp function and the variance of elevation of ADV and HD map feature space data is used in the denominator of the exp function. The similarity metric used to determine a similarity score for each candidate cell in the second sub-set of the 32×32 candidate space of cells. A highest similarity score from among the candidate cells is determined. An offset from the ADV coordinate in the ADV feature space to the best matching cell can be used to determine the high resolution location of the ADV with respect to the HD map feature space.

Projection search module 301B and similarity search module 301C can use all, or part, of the similarity metric above to determine a similarity score for an ADV feature space surrounding a candidate cell to the HD map feature space. In an embodiment, projection search module 301B can project an ADV feature space of a candidate cell onto the HD map feature space and use the similarity metric as a measure of similarity of the ADV feature space to the HD map feature space for each kernel projection in the set of kernel projections. Similarity score represents an iterated product of values that are each less than or equal to 1.0 similarity. Since the product of a set of numbers, each less than 1.0, can only get smaller, and most of the similarity between the ADV feature space surrounding a candidate cell and the HD map feature space is captured in the first few, e.g. five, dimensions of the kernel projections, it can be readily determined whether a candidate cell should be rejected, because the similarity metric is so low that the ADV feature space of the candidate will never be sufficiently similar to the HD map feature space to be deemed a best similarity match for the HD map feature space.

In another embodiment, the similarity metric can be expressed as a log-sum of terms whose sum is always increasing. In this embodiment, the ADV feature space of a candidate cell is most similar to the HD map feature space when the similarity score log-sum is the lowest value. In this embodiment, the similarity metric can drop one or more of the exp, a, the ½ factor within the parenthesis to a power, and signs can square values can be dropped. In this embodiment, when the sum of the terms in the similarity metric is above a threshold value, it can be determined that the candidate cell should be rejected because the similarity metric will never be low enough to indicate a best match of the ADV feature space surrounding the candidate cell to the HD map feature space.

Similarity search module 103C can use the similarity metric, above, in its entirety as-written, to determine a similarity score between an ADV feature space surrounding a candidate cell to the HD map feature space. In an embodiment, projection search module 301B processes a first sub-set of the candidate cells and rejects candidate cells having a similarity score that indicates that the ADV features space surrounding the candidate cell is not a good match to the HD map feature space. When only a threshold number of unrejected candidate cells remains, then a second sub-set of the candidate cells, comprising the remainder of the unrejected candidate cells, can be searching using the similarity search module 301C, until a best matching candidate cell is found that is the center of the best matching ADV feature space to the HD map feature space. This best similarity candidate cell can be used to compute an offset into the HD feature space that determines the ADV location within the HD map feature space.

Perception and planning system 110 can also include a perception module 302. Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 can make a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and steering commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Map update module 306 can be used to gather ADV feature space data and obtain an HD map feature space at an approximate location of the ADV, align the ADV feature space to the HD map feature space using techniques as described above for localization module 301, and upload the ADV feature space, with reference to the corresponding HD map feature space, to a server, such as server 103 for analysis and preprocessing for use by an ADV. The server side functionality is described above with reference to FIG. 1, map updating module 103B and Map Grid 103C.

Persistent storage device 352 can include map and route information 311 and map grid 312. Map and route information can be used to determine a sequence of navigation operations to arrive and a destination. Navigation operations can be expressed as arcs in a graph with weights and attributes that characterize the route, such as speed, traffic, signals, road type, etc. Map grid 312 can be a complete map grid of all known HD map grid feature space within a certain driving locality, such as "within the U.S." or "within California" or "within San Francisco." In an embodiment, map grid 312 can be downloaded as needed from a server, e.g. server 103 or 104, for a radius around the ADV, such as a 100 mile radius.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4A:
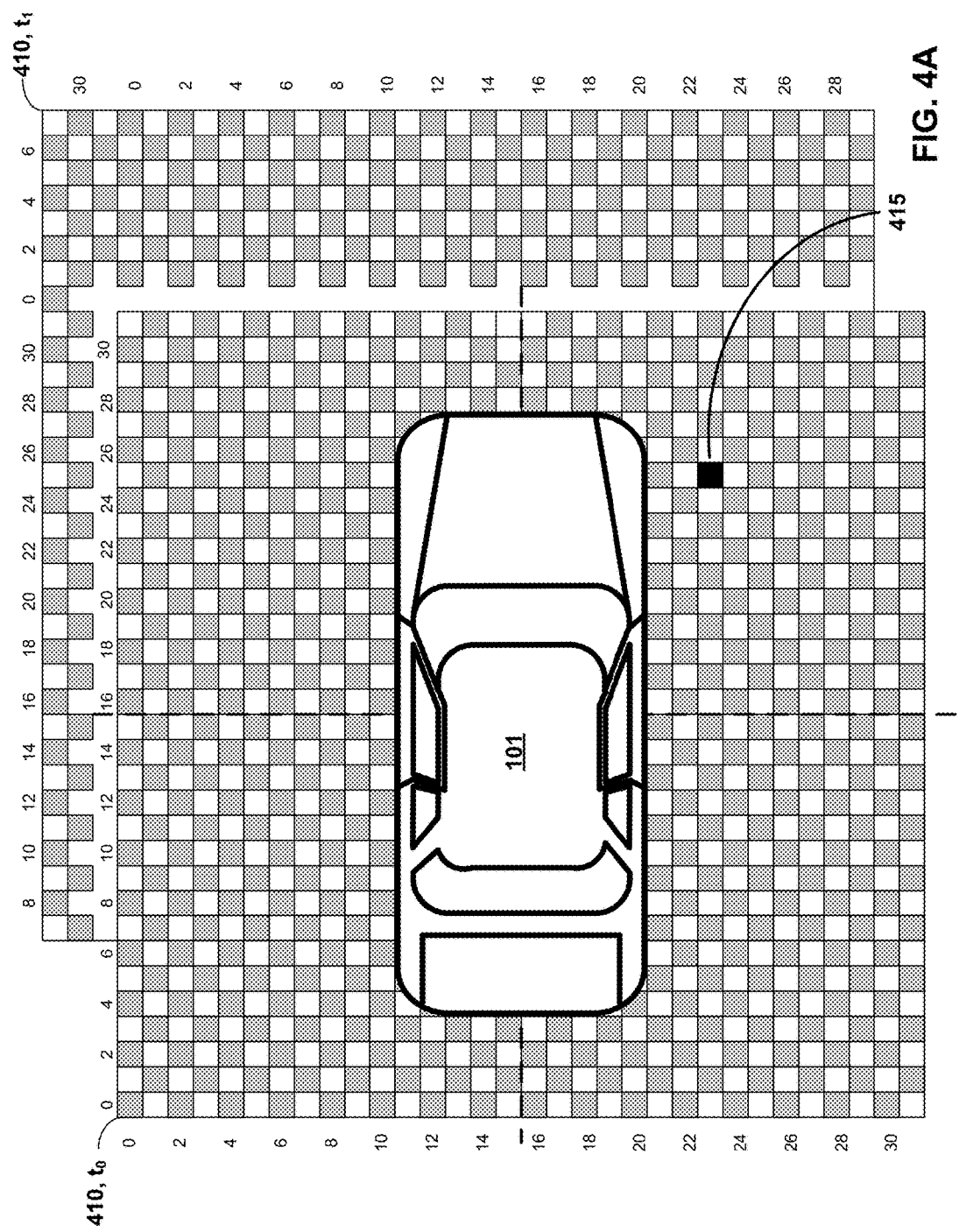
FIG. 4A illustrates and ADV surrounded by an ADV a search space of candidate cells to use for searching an HD map to determine the location of the ADV with respect to the HD map, according to some embodiments.

FIG. 4A illustrates and ADV surrounded by an ADV a search space of candidate cells 410 to use for searching an HD map to determine the location of the ADV with respect to the HD map, according to some embodiments.

An ADV 101 can have a localization module 301 that receives 3D point cloud data from perception module 302. Location module 301A can generate an ADV feature space of e.g. 1024×1024 cells from the 3D point cloud data. Each cell can be, e.g. 10 cm×10 cm and can include (x,y) position coordinates with respect to the ADV, a mean intensity value, an elevation variance value, and other sensor data. As described above, with reference to FIG. 3, it is an object of the Localization Module 301 to determine an accurate location of the ADV with respect to the real world and an HD map representing the real world around the ADV. The ADV can use, e.g. a GPS reading to obtain the HD map section representing the real world around the ADV. The HD map can be, e.g., 1024 cells×1024 cells, each cell representing, e.g. 10 cm×10 cm. Projection search module 301B and similarity search module 301C can select a candidate search space 410 from the ADV feature space. The candidate search space 410 is a subset of the ADV feature space that surrounds the ADV. The candidate search space 410 can be, e.g. 32×32 cells. Search modules 301B and 301C can determine a candidate cell 415 having the highest similarity score. The candidate cell with the highest similarity score 415 can be then be determined as coinciding with the center of the HD map feature space. An offset from the ADV to the center of the HD map can be determined, and the offset can be used to determine the location of the ADV in the real world corresponding the HD map feature space, with high accuracy.

At time t1, the above process can be repeated. Assuming that the ADV is moving, the ADV feature space at time t1 may have some common data with the ADV feature space at time t0. FIG. 4A illustrates a 32×32 search candidate space 410 at time t0 and at time t1. An analogous concept applies to the entire ADV feature space (1024×1024 cells) at time t0 and time t1. Rather than shifting data within the data structure that holds, e.g. the search candidate space, as the ADV moves localization module 301 can determine how much the ADV has moved and how much of the data in the search space 410 is the same at time t1 as at time t0, but is logically displaced by new candidate search space cells of data at time t1. Instead of shifting data in the data structure, an array of indices can be shifted for each of the x-coordinate and y-coordinate directions, as is appropriate for the movement of the ADV. As shown in FIG. 4A, candidate search space 410 at time t1 has added new data as the ADV moves to the right. In the example in the figure, the new search candidate space data is stored in columns 0, 2, 4, and 6 of the search candidate space, overwriting old data. In an embodiment, as the ADV moves forward from time t0 to time t1, new candidate search space cells would be logically be added at e.g. at columns 32, 33, et seq. In an example candidate search space of 32×32 cells, the x-coordinate index of the candidate search array space can be incremented, modulo 32, to obtain the candidate search space array index at which to add new ADV feature space data. Thus, logical column 32 would be 32 modulo 32=0, logical column 33 would be 33 modulo 32=1, et seq. The y-coordinate of a candidate search space grid can be similarly computed. The above example of adding data to a candidate search space of 32×32 can be extended to the ADV feature space, which can be approximately 1024×1024 cells. In an embodiment, the ADV feature space can be 1024×1024 cells to facilitate the ADV feature space data array modulus computation.

Figure 4B:
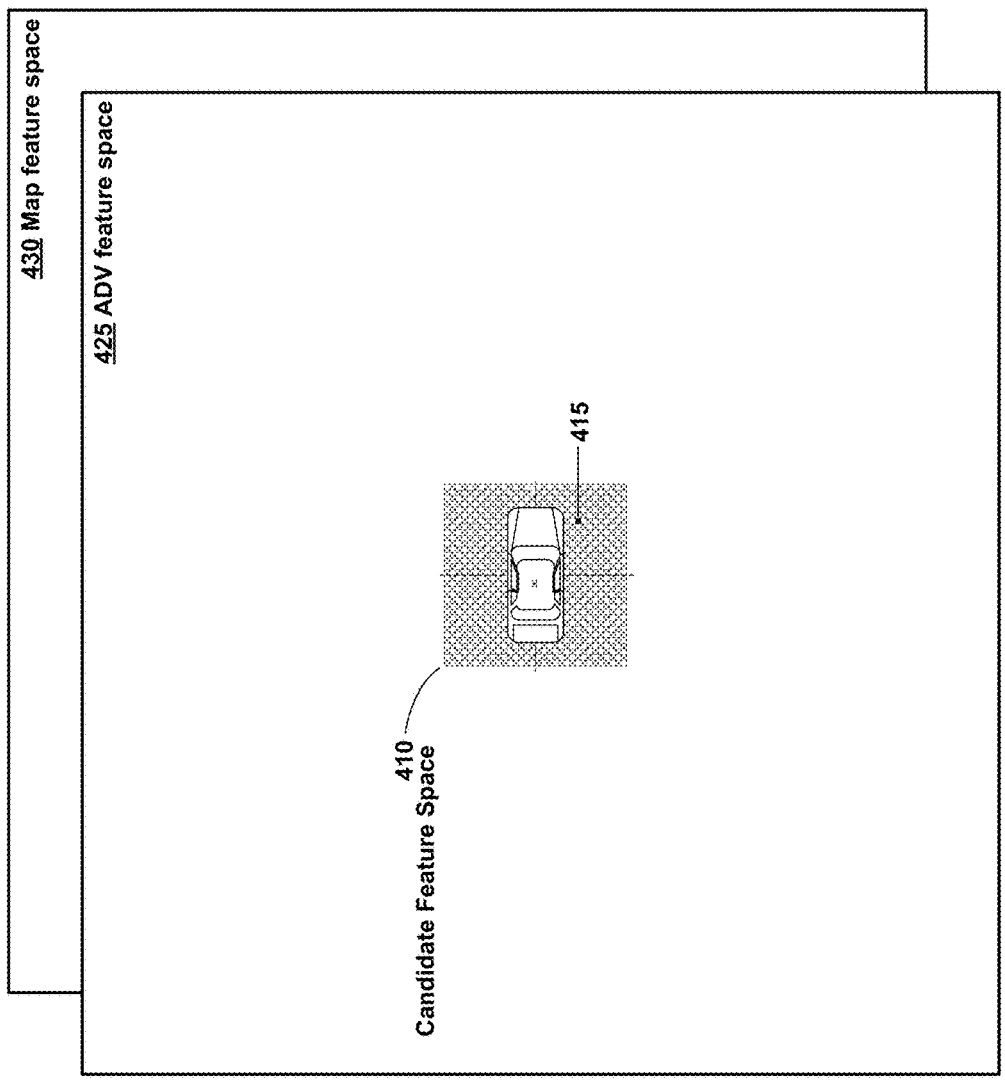
FIG. 4B illustrates and ADV surrounded by an array or grid of candidate cells to use for searching an HD map to determine the location of the ADV with respect to the HD map, and an ADV feature space surrounding the ADV candidate search space, according to some embodiments.

FIG. 4B illustrates and ADV surrounded by an array or grid of candidate cells 410 to use for searching an HD map feature space 430 to determine the location of the ADV with respect to the HD map feature space 430, and ADV feature space surrounding the candidate search 410 space, according to some embodiments.

As described above, an object of the localization module 301 is alignment of an ADV feature space 425, generated from a 3D point cloud of sensor data, to a high definition (HD) map feature space 430 that is centered on a location, e.g. a GPS coordinate, obtained by the ADV. Aligning the ADV feature space 425 to the HD map feature space 430 is an operation in a process to determine the ADV location in the real world, and with respect to the HD map, with high accuracy.

FIG. 4B illustrates the candidate search space 410 of FIG. 4A set in the context of the ADV feature space 425 and HD map feature space 430. The HD map feature space 430 may be offset from the ADV feature space 425 due to limited accuracy of the location sensor, e.g. GPS coordinate or cell tower coordination, that was used to obtain the approximate location of the ADV. For each candidate cell traversed in the ADV candidate search space 410, a feature space of approximately 1024×1024 cells surrounding the candidate cell is compared to the HD map feature space 430 and a similarity score is determined for the candidate cell. A candidate cell having a highest similarity score 415 among the candidate cells in ADV candidate search space 410 is selected as being the cell which best aligns the ADV feature space 425 to the HD map feature space 430. An offset is determined from the ADV to the candidate cell 415 in the ADV candidate search space 410 having the highest similarity score to the HD map feature space. The offset is used to determine, with high accuracy, the location of the ADV with respect to the HD map and real world.

Figure 5:
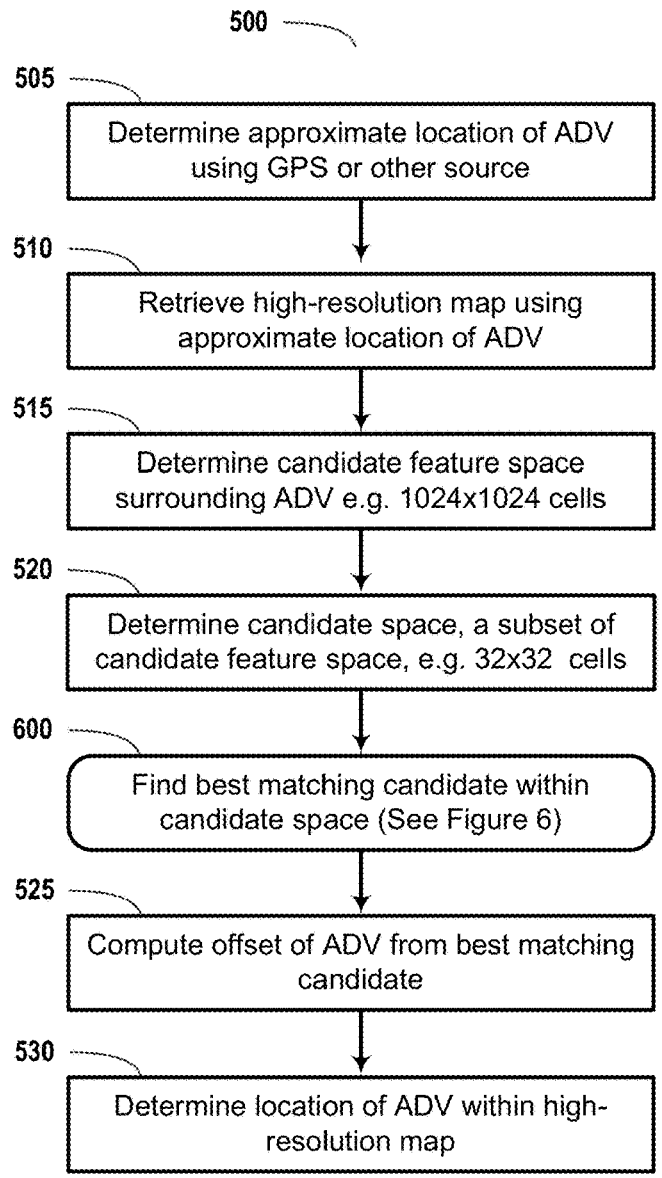
FIG. 5 illustrates, in block form, an overview of a method of searching an HD map feature space to determine the location of an ADV with respect to the HD map, according to some embodiments.

FIG. 5 illustrates, in block form, an overview of a method 500 of searching an HD map feature space 430 to determine the location of an ADV with respect to the HD map, according to some embodiments.

In operation 505, an approximate geo-location of the ADV can be determined using one of more sensors of the perception module 302. The geo-location can be determined using GPS, cell tower triangulation, or other sensor system.

In operation 510, map grid module 312 can retrieve a portion of the HD map corresponding to the geo-location from remove server 103, map grid 103C. In an embodiment, some, or all, of the HD map can be retrieved from ADV storage, e.g. memory 351 or persistent storage 352.

In operation 515, localization module 301 can retrieve a feature space surrounding the ADV, generated by sensors within ADV perception and planning system 110. Localization module 301 can retrieve an ADV feature space 425 that surrounds the ADV, e.g. 1024×1024, from the feature space generated by ADV perception and planning system 110.

In operation 520, localization module 301 can determine a candidate search feature space 410, e.g. 32×32 cells, for use in determining the location of the ADV within the HD map feature space 430.

In operation 600, projection search module 301B and similarity search module 301C can be used to determine the candidate cell having the best matching ADV feature space 425 surrounding the candidate cell, to the HD map feature space 430. Operation 600 is described in detail below with reference to FIG. 6.

In operation 525, localization module 301 can be used to determine an offset from the candidate cell having the best matching ADV feature space 425 surrounding the candidate cell, to the HD map feature space 430.

In operation 530, the offset can be used to determine, with high accuracy, the location of the ADV with respect to the HD map feature space 430.

Figure 6:
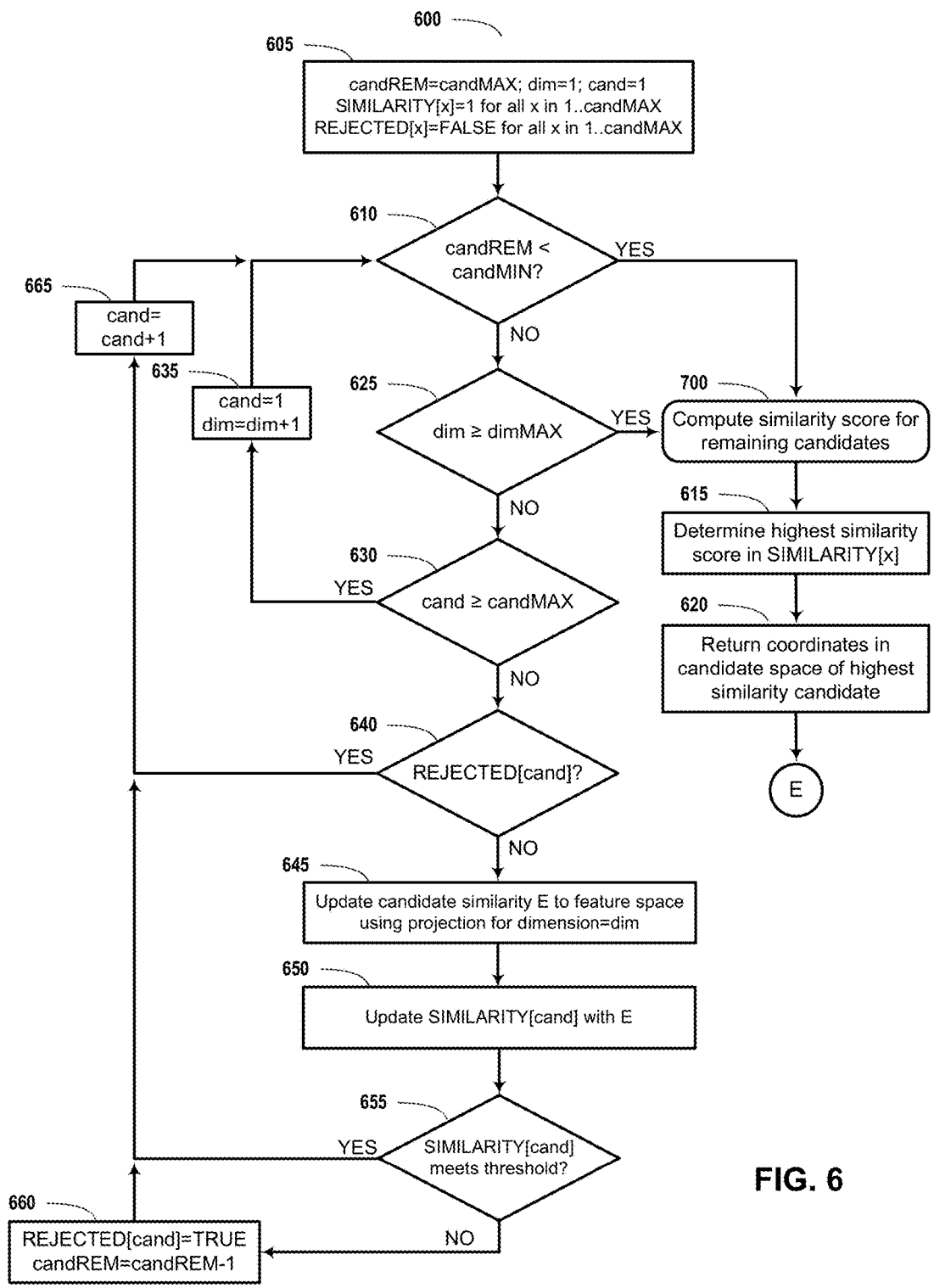
FIG. 6 illustrates, in block form, a method of performing a search of a candidate feature space surrounding an ADV using a projection technique to determine the location of an ADV with respect to the HD map, according to some embodiments.

FIG. 6 illustrates, in block form, a method 600 of performing a search of a candidate feature space 410 surrounding an ADV using a projection technique to determine the location of an ADV with respect to the HD map, according to some embodiments. In method 600, a first sub-set of all candidate cells in the, e.g. 32×32, candidate search feature space 410 can be processed using a projection search method. In the projection search method, an ADV feature space 425 surrounding the candidate cell, e.g. 1024×1024 cells, can be iteratively projected upon the HD map feature space 430 using a sequence of Gray Code Kernels, e.g. Walsh-Hadamard kernel projection vectors, to generate a similarity score between the ADV feature space 425 surrounding the candidate cell, and the HD map feature space 430. When only a threshold number of candidate cells remain to be searched, then the overhead of determining the similarity score for a candidate cell using the projection method may be greater than computing the similarity metric formula described above. The candidate cells searched using the kernel projection technique can comprise a first sub-set of the candidate cells 410. The remaining candidate cells searched using the computed similarity score can comprise a second sub-set of the candidate cells.

In operation 605, variables can be initialized for use in the method 600. The variable candREM represents a number of candidate cells in the candidate feature space 410 that have not yet been rejected. In an embodiment, a candidate cell not yet having been rejected can include candidate cells for which no similarity score has yet been determined. The variable candREM can be initialized to candMAX. The constant candMAX can represent a total maximum number of candidate cells in the candidate search feature space 410. In a 32×32 candidate cell space, candMAX can be initialized to 1024. A variable "dim" is initialized to 1. The variable "dim" represents the projection kernel dimension currently being processed by method 600. A variable "cand" can be initialized to 1. The variable "cand" represents the current candidate cell of the candidate search feature space 410 that is being processed by method 600. Any particular candidate cell may be processed multiple times, such as by subsequent kernel projection dimensions using method 600. An array, SIMLIARITY[x] has dimension "candMax." The array, SIMILARITY[x] is indexed by the variable "cand," and stores the current, updated, similarity score for the current candidate cell "cand." In an embodiment wherein the similarity score for a candidate cell, updated across one or more kernel projection dimensions, is represented as an iterated product of similarity scores, the array SIMILARITY[x] can be initialized to 1 for all array elements. As each candidate cell similarity score is determined for each kernel projection dimension, SIMILARITY[cand] can be updated with the product of SIMILARITY[cand] times the similarity score for the current candidate cell, for the current kernel projection dimension, dim. In an embodiment wherein the similarity score for a candidate cell, updated across multiple kernel projection dimensions, is represented as an iterated sum of similarity scores, e.g. by the log-sum score updating method, then the array SIMILARITY[x] can be initialized to 0 for all array elements. An array (or bit-vector) REJECTED[x] can be initialized to FALSE for all array elements. The array REJECTED[x] tracks whether a particular candidate cell has been rejected from further similarity score determinations because its similarity score is too low for the candidate cell to ever become the highest score candidate cell.

In operation 610, it can be determined whether the number of candidate cells remaining, candREM, is less than a minimum threshold, candMIN. The variable candREM represents the number of candidate cells in the, e.g. 32×32 cells, that have not yet been rejected as having a similarity score that does not meet a threshold value. When the number of unrejected candidate cells remaining is less than candMIN, then the similarity score for a candidate cell can be determined using the similarity metric formula described above.

If, in operation 610, it was determined that the number of candidate cells remaining is less than a threshold minimum, candMIN, then method 600 continues at operation 700, otherwise method 600 continues at operation 625.

In operation 700, the similarity score for the ADV feature space 410 surrounding the candidate cell, cand, to the HD map feature space 430 can be determined using the similarity metric formula described above. Operation 700 is described in detail below, with reference to FIG. 7. Method 600 continues at operation 615.

In operation 615, the highest similarity score as among all candidate cells, stored in the SIMILARITY[x] array, is determined. In an embodiment, the array SIMILARITY[x] can be search sequentially to determine the candidate having the highest similarity score.

In operation 620, the coordinates of the candidate cell having the highest similarity score in SIMILARITY[x] is returned and is used in FIG. 5 operations 525 and 530 to determine the offset of the ADV within the HD map feature space. Method 600 then ends.

If, in operation 610, it was determined that the number of remaining candidate cells, candREM, is not less than the minimum number of candidate cells, candMIN, then in operation 625 it can be determined whether the current kernel projection dimension is greater than or equal a maximum number of kernel projection dimensions. In an embodiment, the maximum number of kernel projection dimensions can be 500. If the current dimension is greater than or equal to the maximum number of kernel projection dimensions, then method 600 continues at operation 700, otherwise method 600 continues at operation 630.

In operation 630, if the current candidate number, cand, is greater than or equal to the maximum number of candidates in the candidate space, e.g. 1024, for a 32×32 cell candidate space, then method 600 continues at operation 635, otherwise method 600 continues at operation 640.

In operation 635, the current candidate number, cand, can be reset to 1, and the current projection kernel dimension, dim, can be incremented. Method 600 resumes at operation 610.

If, in operation 630, it was determined that the current candidate number, cand, is not greater than or equal to the maximum number of candidate cells, candMAX, then in operation 640, it can be determined the current candidate cell, cand, has been previously rejected. Candidate cell, cand, has been previously rejected if REJECTED[cand] is TRUE. If, in operation 640, REJECECT[cand] is TRUE, then method 600 continues at operation 665, otherwise method 600 continues at operation 645.

In operation 645, the ADV feature space 425 surrounding the current candidate cell, cand, is projected onto the HD map feature space 430 using the current dimension kernel projection vector to determine a similarity score between the ADV feature space 410 and HD map feature space 430.

In operation 650, the similarity score, E, between the ADV feature space 425 surrounding the current candidate cell, cand, and the HD map feature spaced 430 is used to update the similarity score SIMILARITY[cand] for the current candidate cell, cand.

In operation, if the updated similarity score, SIMILARITY[cand], for the current candidate cell, cand, does not meet a threshold criteria, then in operation 660, the current candidate cell is rejected by setting REJECTED[cand] =TRUE, and decrementing the number candidate cells remaining, candREM. The threshold criteria test depends upon the technique used to determine similarity. If the embodiment used that determines similarity for the ADV feature space 425 surrounding the candidate cell, cand, to the HD map feature space 430 is determined as a product of iterated values, then we are looking for the highest similarity score (up to a maximum of 1.0) and the threshold for rejection can be that the updated similarity score SIMLIARITY[cand] is less than, e.g. 0.7. In the embodiment using the log-sum technique, we are looking for the smallest sum of iterated similarity scores. Thus if the updated similarity score, SIMILARITY[cand] is greater than a threshold sum value, then the candidate cell is rejected and REJECTED[cand] is set to TRUE in operation 660.

Method 600 continues at operation 665.

In operation 665, the current candidate value can be incremented, cand=cand+1, and method 600 continues at operation 610.

Figure 7:
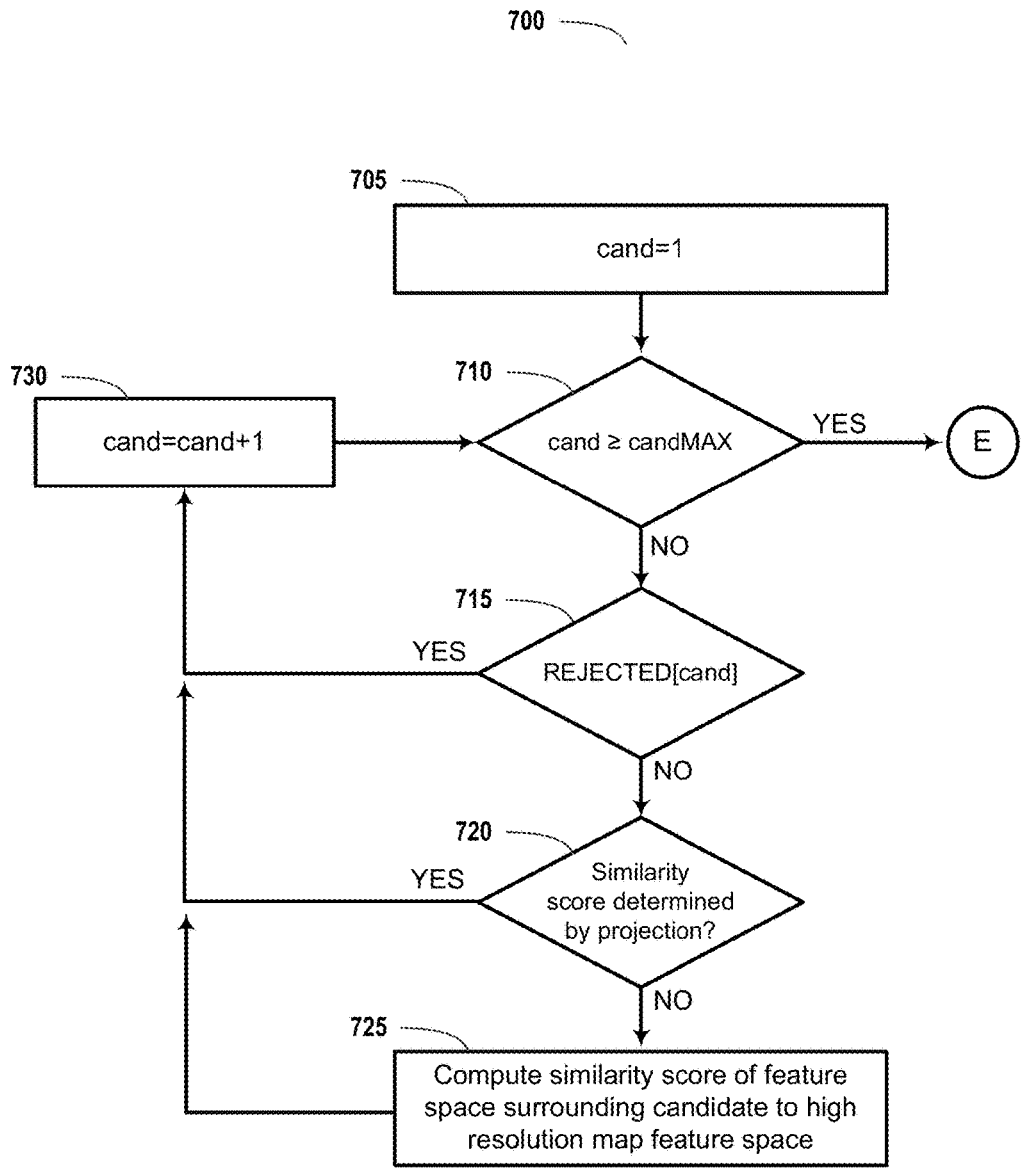
FIG. 7 illustrates, in block form, a method of determining similarity scores of remaining candidate cells in a candidate feature space surrounding the ADV after initially using a projection technique, according to some embodiments.

FIG. 7 illustrates, in block form, a method 700 of determining similarity scores of remaining candidate cells in a candidate feature space surrounding the ADV 425 after initially using a projection technique, according to some embodiments. As described above, a first sub-set of the candidate cells are searched using a kernel projection method, by projection search module 301B. When a minimum threshold number of non-rejected candidate cells remain to be searched, e.g. 50 for a 32×32 cell candidate search space, the overhead to use the kernel project method can be greater than computing a similarity score using the similarity score metric described above. Thus a second sub-set of the candidate cells comprises those candidate cells that have not been rejected and/or have not yet been searched using the kernel projection method. One way to determine a similarity score is to compute the similarity score using the similarity metric described herein. The similarity metric described herein uses a hybrid Gaussian fit of the candidate cell feature space to the HD map feature space using the mean of intensity of each cell of the candidate cell feature space and HD map feature space. The hybrid Gaussian fit of the candidate cell feature space to the HD map feature space additionally uses the variance in elevation of each cell of the candidate feature space and HD map feature space.

In operation 705, a variable candidate cell index variable, cand, can be initialized to 1.

In operation 710, it can be determined whether the current candidate cell index, cand, is greater than or equal to the maximum number of candidate cells, candMAX. In an embodiment wherein the candidate space is 32×32 cells, candMAX can be 1024 cells (32×32).

If, in operation 710, it is determined that the current candidate index, cand, is greater than or equal to candMAX, then method 700 can end because all candidate cells have either had a similarity score determined by the kernel projection technique in method 600, or by the similarity metric computation in method 700.

If, in operation 710, it is determined that the current candidate index, cand, is not greater than or equal to candMAX, then method 700 continues at operation 715.

In operation 715, it can be determined whether the current candidate cell has been previously rejected, REJECTED[cand]=TRUE. If so, then method 700 continues at operation 730, otherwise method continues at operation 720.

In operation 720, it can be determined whether a similarity score has already been determined for this candidate cell using the kernel projection technique. This can be determined by examining the SIMILARITY[cand] value to see if it differs from the initialized value of operation 605, in method 600, FIG. 6. As described above, the initialized value for all SIMILARITY[x] array elements in operation 605, above, can be 1 when the similarity score is determined as an iterated product similarity scores of kernel projections and can be 0 when the similarity score for a candidate cell is determined as an sum of similarity scores of iterated kernel projections (log-sum method). If the similarity score for the current candidate, SIMILARITY[cand], was determined by the kernel projection technique in method 600, then method 700 continues at operation 730. Otherwise method 700 continues at operation 725.

In operation 725, the similarity score for the ADV feature space 410 surrounding the current candidate cell, to the HD map feature space, is computed using the similarity metric formula described above, and stored in SIMILARITY[cand].

In operation 730, the current candidate cell can be incremented, cand=cand+1, to the next sequential candidate cell.

Figure 8:
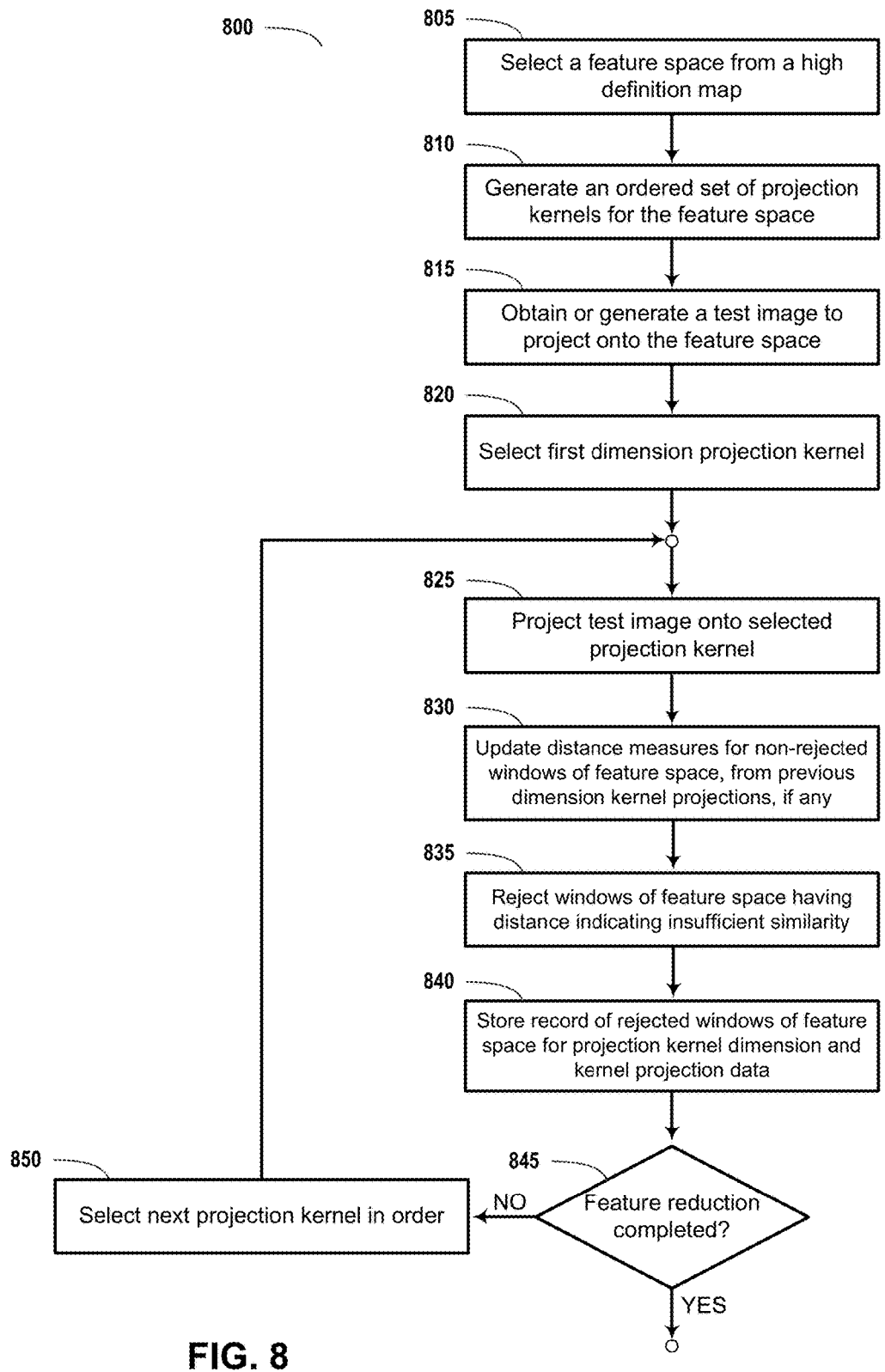
FIG. 8 illustrates, in block form, a method of reducing the number of features in an HD map feature space by preprocessing the HD map feature space, according to some embodiments.

FIG. 8 illustrates, in block form, a method 800 of reducing the number of features in an HD map feature space 430 by pre-processing the HD map feature space using a test image, according to some embodiments. HD map feature space 430 can comprise a 1024×1024 cell feature space that is a subset of the HD map. Method 800 can be performed by server 103, by one or more of machine learning engine 103A and/or map updating module 103B, to generate map grid 103C. Features in the HD map can be reduced by using an ordered sequence of kernel projections, onto the HD map feature space. A distance measure, such as the similarity metric formula described above, can be used to determine a distance measure at a particular location in the HD map feature space. The smaller the distance measure at a particular location, the more similar a portion of the test image is to a local window of the HD feature space. Using relatively few projections, a large number of the local windows can be rejected as not being similar enough to a portion of the test image. For example, the first 10, e.g. out of 256, kernels can capture 70% of the distance measure between a portion of the test image and a local window of the HD map feature space. In an embodiment, the ordered set of kernels comprise a Gray Code Sequence. In an embodiment, the ordered set of kernels comprise Walsh-Hadamard sequence of kernel vectors. In method 800, a Walsh-Hadamard tree can be generated during projection of the test image onto the HD map feature space using the kernel projection vector. The Walsh-Hadamard tree comprises a Gray Code pattern matching tree that can be used to filter out features of the HD map that do not contain sufficient similarity to a portion of the test image to be used for pattern matching analysis.

In operation 805, a feature space 430 can be selected from an HD map containing a large plurality of feature spaces.

In operation 810, an ordered set of projection kernels can be generated for the HD map feature space 430. In an embodiment, the projection kernels comprise Gray Code Kernels (GCK). In an embodiment, the projection kernels comprise an ordered sequence of Walsh-Hadamard kernels.

In operation 815, a test image can be obtained to project onto the HD map feature space 430, using the sequence of projection kernels. In an embodiment, the test image can comprise the HD map feature space 430. In an embodiment, the text image can comprise an image generated from a plurality of ADV feature spaces that correspond to the geo-location for the selected feature space 430 of operation 805. Machine learning engine 103A can receive the plurality of feature spaces from the plurality of ADVs and generate the test image using machine learning techniques.

In operation 820, a first dimension kernel projection can be selected from the ordered set of kernel projections generated in operation 810.

In operation 825, the test image can be projected onto the selected HD map feature space 430 using the selected projection kernel. The projection may break the HD map features space 430 into a plurality of local windows of the HD map feature space 430.

In operation 830, a distance measure for non-rejected local windows of the HD map feature space 430 can be updated, from distance measures generated from previously selected kernel projections (if any).

In operation 835, local windows of HD map feature space 430 having a distance measure that does not meet a threshold value can be rejected. The rejection of windows of the HD map features space 430, using the kernel projections, reduces the number of features in the HD feature space 430, thus making the real-time projection of an ADV feature space onto the HD map feature space more efficient and less computationally intensive.

In operation 840, a record of the rejected windows of the HD map feature space 430 for the selected projection kernel dimension, and other kernel projection data, can be stored in association with the HD map feature space 430 and the selected kernel projection dimension. In an embodiment, other kernel projection data comprises a Gray Code filter generated using the test image, HD feature space 430, and selected kernel projection vector.

In operation 845, it can be determined whether the feature reduction of the HD map feature space 430 is complete. Feature reduction can be deemed complete if all projection kernel dimensions have been processed for the test image and HD map feature space 430. In an embodiment, there can be up to 500 dimensions of kernel projection, and feature reduction is complete at the $500^{th}$ dimension kernel projection. In an embodiment, feature reduction can be deemed completed when the number of non-rejected portions of the HD map feature space reaches a predefined value.

If, in operation 845, it is determined that feature space reduction has been completed, then method 800 ends, otherwise method 800 continues at operation 850.

In operation 850, a next kernel project vector can be selected, in order, and method 800 continues at operation 825.

Figure 9:
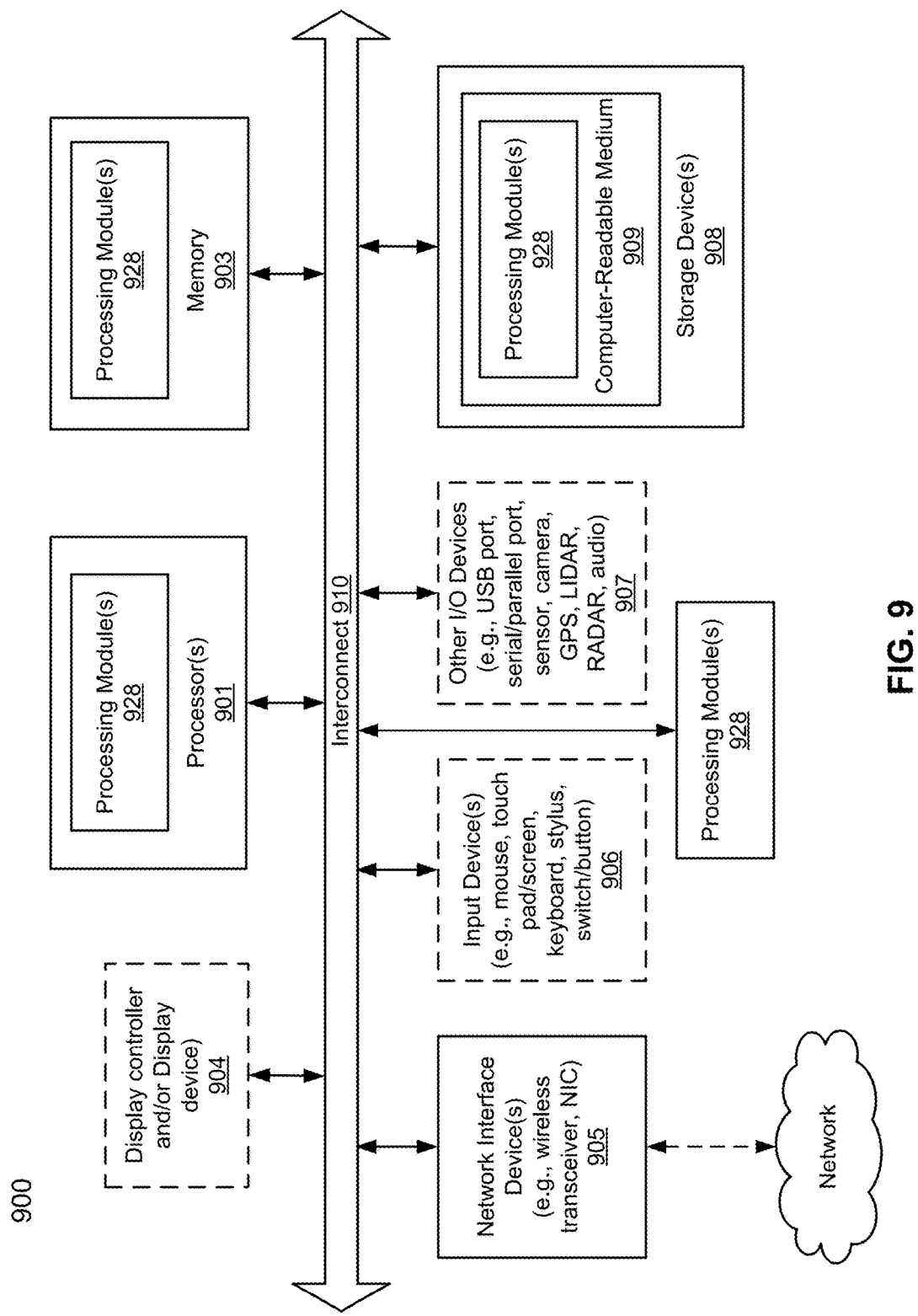
FIG. 9 is a block diagram illustrating a data processing system according to one embodiment.

FIG. 9 is a block diagram illustrating an example of a data processing system 900 which may be used with one embodiment of the invention. For example, system 900 may represent any of data processing systems described above performing any of the processes or methods described above, such as, for example, autonomous vehicle 101 systems, such as perception and planning 110, control system 111, infotainment system 114, etc., or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), an embedded processing controller, a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In an embodiment, processor(s) 901 comprise at least one hardware processor.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900. IO devices 907 may further include a RADAR system (radio detection and ranging), a LIDAR system (light detection and ranging), a GPS system (global positioning system), cell phone subsystems that can detect and triangulate using cell towers, microphone(s), and other, audio/video recording camera(s), position, distance, time, speed, acceleration, horizontal and vertical level detectors, orientation, and directional sensors.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, autonomous vehicle 101 (AV) localization module 301, perception module 302, driving decision module 303, planning module 304, control module 305, map update module 306, and one or more modules to process sensor data to for driving the AV planning and control modules. Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components. Processing logic can include, e.g. pre-processing of an HD map feature space using a sequence of projection kernels, as described above with reference to FIG. 8. Processing login can further include, e.g. logic to determine a location of an ADV with respect to the HD map feature space, using a kernel projection technique as implemented by projection search module 301B, or by similarity search module 301C, and as described with reference to FIGS. 5-7.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of determining a location of an autonomous driving vehicle (ADV) with respect to a high definition (HD) map and navigating the ADV, the method comprising:
   determining a first sub-set of a plurality of candidate cells of an ADV feature space of cells surrounding the ADV, the ADV feature space derived from a three-dimensional (3D) point cloud of sensor data obtained by sensors of the ADV;
   for each candidate cell in the first sub-set of the plurality of candidate cells:
      determining a similarity score between a subset of the ADV feature space that surrounds the candidate cell and an HD map feature space, by projecting the subset of the ADV feature space onto the map feature space using a first dimension projection kernel;
      in response to determining that the similarity score is less than a threshold amount, marking the candidate cell as rejected, otherwise storing the similarity score in association with the candidate cell;
   determining a location of the ADV with respect to the HD map feature space based at least in part on a candidate cell in the plurality of candidate cells having a highest similarity score among the plurality of candidate cells; and
   navigating the ADV along a planned route, the navigating based at least in part on the determined location of the ADV with respect to the HD map.

2. The method of claim 1, wherein determining the location of the ADV with respect to the map feature space comprises:
   determining the coordinates of the candidate cell having the highest similarity score among the plurality of candidate cells that are not rejected.

3. The method of claim 1, wherein the first sub-set of the plurality of candidate cells comprises all of the plurality of candidate cells.

4. The method of claim 1, further comprising:
in response to the candidate cell not being marked as rejected, determining a second similarity score between the candidate cell and the map feature space by projecting the subset of the ADV feature space onto the map feature space using a second dimension projection kernel, wherein the first dimension projection kernel captures a larger portion of the similarity of the ADV feature space surrounding the candidate cell to the HD map feature space than the second dimension projection kernel captures; and
determining an updated similarity score by using the stored similarity score for the candidate cell and the second similarity score; and
in response to determining that the updated similarity score is less than the threshold amount, marking the candidate cell as rejected, otherwise storing the updated similarity score in association with the candidate cell.

5. The method of claim 4, wherein the first and second dimension projection kernels comprise an ordered sequence of Gray-Code kernels.

6. The method claim 1, further comprising:
determining a second sub-set of the plurality of candidate cells comprising, each candidate cell in the second subset of the plurality of candidate cells not having been rejected and not having had a similarity score stored in association with the candidate cell, and each candidate cell in the second sub-set having a median intensity and a variance in elevation;
for each candidate cell in the second sub-set:
determining a similarity score between a subset of the ADV feature space that surrounds the candidate cell, and the map feature space, using the median intensity and variance in elevation.

7. The method of claim 6, wherein determining the second sub-set is performed in response to one of:
determining that a count of candidate cells in the plurality of candidate cells, each candidate cell in the count not having been rejected and not having had a similarity score stored in association with the candidate cell, is less than a threshold number of candidate cells; or
determining that a maximum number of dimensions of projection kernels has been reached.

8. A non-transitory machine-readable medium having instructions stored therein, which when executed by a processor, cause the processor to perform operations for determining a location of an autonomous driving vehicle (ADV) with respect to a high definition (HD) map, the operations comprising:
determining a first sub-set of a plurality of candidate cells of an ADV feature space of cells surrounding the ADV, the ADV feature space derived from a three-dimensional (3D) point cloud of sensor data obtained by sensors of the ADV;
for each candidate cell in the first sub-set of the plurality of candidate cells:
determining a similarity score between a subset of the ADV feature space that surrounds the candidate cell, and an HD map feature space, by projecting the subset of the ADV feature space onto the map feature space using a first dimension projection kernel; and
in response to determining that the similarity score is less than a threshold amount, marking the candidate cell as rejected, otherwise storing the similarity score in association with the candidate cell;
determining a location of the ADV with respect to the HD map feature space based at least in part on a candidate cell in the plurality of candidate cells having a highest similarity score among the plurality of candidate cells; and
navigating the ADV along a planned route, the navigating based at least in part on the determined location of the ADV with respect to the HD map.

9. The medium of claim 8, wherein determining the location of the ADV with respect to the map feature space comprises:
determining the coordinates of the candidate cell having the highest similarity score among the plurality of candidate cells that are not rejected.

10. The medium of claim 8, wherein the first sub-set of the plurality of candidate cells comprises all of the plurality of candidate cells.

11. The medium of claim 8, further comprising:
in response to the candidate cell not being marked as rejected, determining a second similarity score between the candidate cell and the map feature space by projecting the subset of the ADV feature space onto the map feature space using a second dimension projection kernel, wherein the first dimension projection kernel captures a larger portion of the similarity of the ADV feature space surrounding the candidate cell to the HD map feature space than the second dimension projection kernel captures; and
determining an updated similarity score by using the stored similarity score for the candidate cell and the second similarity score; and
in response to determining that the updated similarity score is less than the threshold amount, marking the candidate cell as rejected, otherwise storing the updated similarity score in association with the candidate cell.

12. The medium of claim 11, wherein the first and second dimension projection kernels comprise an ordered sequence of Gray-Code kernels.

13. The medium claim 8, the operations further comprising:
determining a second sub-set of the plurality of candidate cells comprising, each candidate cell in the second subset of the plurality of candidate cells not having been rejected and not having had a similarity score stored in association with the candidate cell, and each candidate cell in the second sub-set having a median intensity and a variance in elevation;
for each candidate cell in the second sub-set:
determining a similarity score between a subset of the ADV feature space that surrounds the candidate cell, and the map feature space, using the median intensity and variance in elevation.

14. The medium of claim 13, wherein determining the second sub-set is performed in response to one of:
determining that a count of candidate cells in the plurality of candidate cells, each candidate cell in the count not having been rejected and not having had a similarity score stored in association with the candidate cell, is less than a threshold number of candidate cells; or
determining that a maximum number of dimensions of projection kernels has been reached.

15. A data processing system, comprising:
a processor; and
a memory coupled to the processor to store instructions, which when executed by the processor, cause the processor to perform operations for determining a location of an autonomous driving vehicle (ADV) with respect to a high definition (HD) map and navigating the ADV, the operations including:

determining a first sub-set of a plurality of candidate cells of an ADV feature space of cells surrounding the ADV, the ADV feature space derived from a three-dimensional (3D) point cloud of sensor data obtained by sensors of the ADV;

for each candidate cell in the first sub-set of the plurality of candidate cells:
- determining a similarity score between a subset of the ADV feature space that surrounds the candidate cell, and an HD map feature space, by projecting the subset of the ADV feature space onto the map feature space using a first dimension projection kernel; and
- in response to determining that the similarity score is less than a threshold amount, marking the candidate cell as rejected, otherwise storing the similarity score in association with the candidate cell;

determining a location of the ADV with respect to the HD map feature space based at least in part on a candidate cell in the plurality of candidate cells having a highest similarity score among the plurality of candidate cells; and navigating the ADV along a planned route, the navigating based at least in part on the determined location of the ADV with respect to the HD map.

16. The system of claim 15, wherein determining the location of the ADV with respect to the map feature space comprises:
determining the coordinates of the candidate cell having the highest similarity score among the plurality of candidate cells that are not rejected.

17. The system of claim 15, wherein the first sub-set of the plurality of candidate cells comprises all of the plurality of candidate cells.

18. The system of claim 15, further comprising:
in response to the candidate cell not being marked as rejected, determining a second similarity score between the candidate cell and the map feature space by projecting the subset of the ADV feature space onto the map feature space using a second dimension projection kernel, wherein the first dimension projection kernel captures a larger portion of the similarity of the ADV feature space surrounding the candidate cell to the HD map feature space than the second dimension projection kernel captures; and
determining an updated similarity score by using the stored similarity score for the candidate cell and the second similarity score; and
in response to determining that the updated similarity score is less than the threshold amount, marking the candidate cell as rejected, otherwise storing the updated similarity score in association with the candidate cell.

19. The system of claim 18, wherein the first and second dimension projection kernels comprise an ordered sequence of Gray-Code kernels.

20. The system claim 15, the operations further comprising:
determining a second sub-set of the plurality of candidate cells comprising, each candidate cell in the second subset of the plurality of candidate cells not having been rejected and not having had a similarity score stored in association with the candidate cell, and each candidate cell in the second sub-set having a median intensity and a variance in elevation;
for each candidate cell in the second sub-set:
determining a similarity score between a subset of the ADV feature space that surrounds the candidate cell, and the map feature space, using the median intensity and variance in elevation.

21. The system of claim 20, wherein determining the second sub-set is performed in response to one of:
determining that a count of candidate cells in the plurality of candidate cells, each candidate cell in the count not having been rejected and not having had a similarity score stored in association with the candidate cell, is less than a threshold number of candidate cells; or
determining that a maximum number of dimensions of projection kernels has been reached.

\* \* \* \* \*